D. D. Edgerton,

Milk Can Fastener.

No. 109,400. Patented Nov. 22. 1870.

WITNESSES
A. B. Gardner
A. H. Brach

INVENTOR
Daniel D. Edgerton,
by Wm. H. Fisher, his
attorney in fact.

United States Patent Office.

DANIEL D. EDGERTON, OF AVA, NEW YORK.

Letters Patent No. 109,400, dated November 22, 1870.

IMPROVEMENT IN MILK-CAN FASTENERS.

The Schedule referred to in these Letters Patent and making part of the same.

*To all whom it may concern:*

Be it known that I, DANIEL D. EDGERTON, of the town of Ava, in the county of Oneida and State of New York, have invented a new and original device for attaching Milk-Cans to Wagon-bottoms or Platforms.

Nature of my Invention.

My invention relates to the forming of ears or lugs upon the lower part of the sides of a milk-can or pail, and arranging these ears with reference to one or more hooks fastened to the wagon-bottom or platform, and operated by a hand-lever, in such a manner that by placing these ears under said hook or hooks, and pressing down said hand-lever, and securing it in position, by a suitable catch, the hook or hooks will simultaneously catch over the said ear or ears, and hold the milk-can securely in its place on a wagon or platform; and that, on the other hand, by lifting the lever, the hooks will clear the ears and the can may be readily removed.

Description of the Accompanying Drawing.

Figure 3 shows the ears and their relative position on the milk-can.

General Description.

A (see figs. 1, 3, and 4,) is a wagon bottom or platform.

B is a milk-can.

Figure 1:
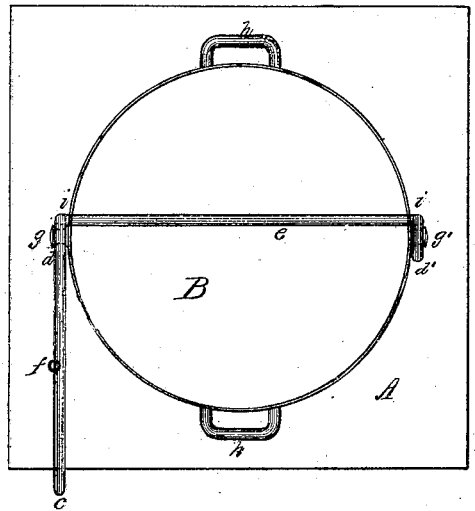
Figure 1 is a plan view of the bottom of a wagon or platform, and a top view of a milk-can, with the bottom removed, the whole showing the top of my fastening device.
Figure 2:
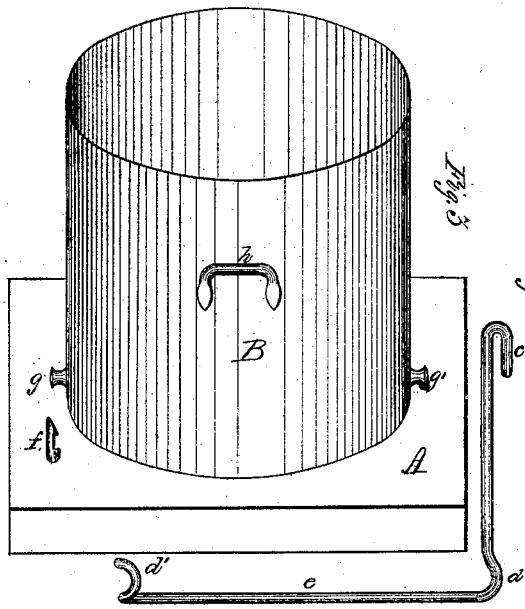
Figure 2 is a view of the hand-lever, hooks, and of the rod connecting these hooks.
Figure 5:
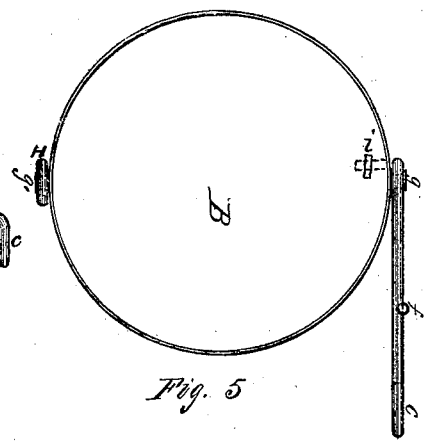
Figure 5 shows a method of fastening down the can, when only one hook is employed.

In figs. 1, 2, and 3, $e$ is a rod; $d\ d'$ are hooks connected by the rod $e$.

C is a lever, attached to one end of hook $d$.

Usually the lever, hooks, and rod are all made out of a single metal wire or rod.

$g\ g'$ are ears or lugs, attached to the lower parts of the sides of the can, and so arranged that the hooks $d\ d'$ may pass around them securely.

$i\ i$ are staples, or other suitable devices, for fastening the rod $e$ to the bottom of a wagon or platform.

Figure 4:
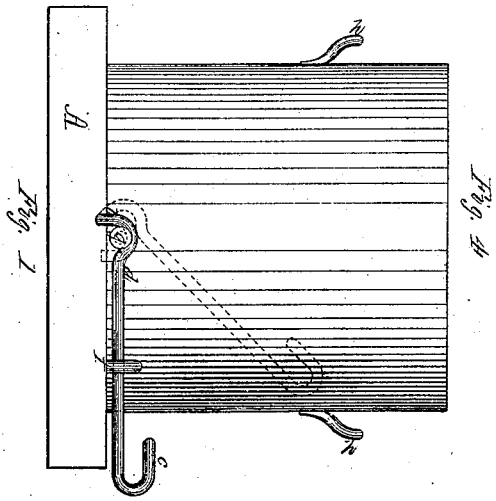
Figure 4 is a side elevation of the catch, the lever, and one of the ears, and one of the hooks, in working position.

$f$, figs. 1, 3, and 4, is a catch, for the purpose of catching and holding securely in position the lever C.

$h\ h$ are the handles of the milk-can.

Mode of Operation.

My device is first attached to the bottom of the wagon or platform on which the milk-can is to be placed.

This is done by securing the rod $e$ to such bottom or platform by staples or other suitable fastenings.

The length of the rod $e$ must be such as to allow the milk-can to fit closely between the hooks $d\ d'$.

When it is desired to fasten the can to said wagon-bottom or platform, the lever C is raised up, as shown in fig. 4, by the dotted lines.

The milk-can is then so placed that each of the ears $g\ g'$ are under one of the hooks $d$ or $d'$, and also nearly over the rod $e$. The lever C is then brought over and down, and secured, under the catch $f$, in position, as shown in figs. 1 and 4, by the dark lines.

During this operation the hooks $d\ d'$ will have passed around the ears, and will hold the can securely to the platform.

When it is desired to unfasten the can, the operator brings the lever C from under the catch-hook $f$, by pressing said catch laterally, and raising the lever, and throwing it over back. The can is then unfastened.

My device is simple, convenient, and durable, and superior in every respect to the common methods of fastening milk-cans to wagon-bottoms or platforms, by drawing straps through the handles $h\ h$ (see figs. 1, 3, and 4,) of the can, and then passing these straps through rings or staples on the bottom or platform of the wagon, and finally fastening them by buckling or tying.

The fastening and unfastening milk-cans with straps consumes from five to six minutes. The same operation can be accomplished by my device in as many seconds.

Claims.

I claim—

1. The arrangement of ears $g\ g$ upon the lower part of the sides of a milk-can, in combination with a locking mechanism, substantially as described.

2. The milk-can fastener, consisting of the rod $e$, hooks $d\ d'$, lever C, and catch $f$, in combination with the ears $g\ g'$ and milk-can B, substantially as and for the purposes specified.

DANIEL D. EDGERTON.

Witnesses:
JOHN M. EDGERTON,
WM. E. SCOVILLE.